US012330422B2

(12) United States Patent
Namiki et al.

(10) Patent No.: US 12,330,422 B2
(45) Date of Patent: Jun. 17, 2025

(54) SERVICE TANK

(71) Applicant: MIYAKOSHI PRINTING MACHINERY CO., LTD., Narashino (JP)

(72) Inventors: Takao Namiki, Sakura (JP); Wataru Itabashi, Funabashi (JP); Mizuki Sugahara, Funabashi (JP)

(73) Assignee: MIYAKOSHI PRINTING MACHINERY CO., LTD., Narashino (JP)

( * ) Notice: Subject to any disclaimer, the term of this patent is extended or adjusted under 35 U.S.C. 154(b) by 180 days.

(21) Appl. No.: 18/170,906

(22) Filed: Feb. 17, 2023

(65) Prior Publication Data

US 2023/0278339 A1 Sep. 7, 2023

(30) Foreign Application Priority Data

Mar. 2, 2022 (JP) ................................ 2022-032189

(51) Int. Cl.
*B41J 2/175* (2006.01)
*B41J 2/14* (2006.01)

(52) U.S. Cl.
CPC ....... *B41J 2/17503* (2013.01); *B41J 2/14088* (2013.01); *B41J 2/1433* (2013.01); *B41J 2002/14467* (2013.01); *B41J 2202/05* (2013.01)

(58) Field of Classification Search
CPC .. B41J 2/17503; B41J 2/14088; B41J 2/1433; B41J 2002/14467; B41J 2202/05; B41J 2/17513; B41J 2/01; B41J 2/17566
See application file for complete search history.

(56) References Cited

U.S. PATENT DOCUMENTS

| | | | |
|---|---|---|---|
| 5,583,544 A * | 12/1996 | Stamer | B41J 2/17503 347/7 |
| 7,490,926 B2 | 2/2009 | Matsuba et al. | |
| 2018/0345671 A1* | 12/2018 | Yoshii | B41J 13/00 |

FOREIGN PATENT DOCUMENTS

| | | |
|---|---|---|
| JP | 2005313384 A | 11/2005 |

* cited by examiner

*Primary Examiner* — Lisa Solomon
(74) *Attorney, Agent, or Firm* — FLYNN THIEL, P.C.

(57) ABSTRACT

A service tank includes a container having an internal space, the container being provided with an inlet through which ink is introduced into the internal space and a plurality of supply ports through which the ink is supplied, a divider configured to divide the internal space into a plurality of compartments, and a detector configured to detect that the liquid surface of the ink is at an upper limit or a lower limit. The divider is attached between the inlet and a supply port located closest to the inlet. The divider includes a plate that prevents flow of the ink and air between adjacent compartments, an ink opening through which the ink flows between the adjacent compartments, and an air opening through which the air flows between the adjacent compartments. The plate, the ink opening, and the air opening are located in, below, and above the proper area, respectively.

15 Claims, 10 Drawing Sheets

SERVICE TANK

TECHNICAL FIELD

The present invention relates to a service tank used in an inkjet printing apparatus and configured to temporarily store ink introduced from an ink tank and supply the ink directly to a printing unit.

BACKGROUND

An inkjet printing apparatus is an apparatus provided with a printing unit and configured to do printing by discharging fine droplets of ink from the printing unit onto a printed medium. For this purpose, in the inkjet printing apparatus, there is a continuous supply of ink from an ink tank to the printing unit via a service tank.

Note here that the service tank is intended to temporarily store ink and supply the ink directly to the printing unit.

In the inkjet printing apparatus, providing the service tank and, for example, managing the amount of ink stored in the service tank makes it possible to prevent the printing unit from becoming short of ink.

Incidentally, in the inkjet printing apparatus, during the introduction of ink into the service tank or the supply of ink to the printing unit, so-called waves are undesirably generated in the ink stored in the service tank. For example, generation of waves that are transmitted in ink (such waves being hereinafter also referred to as "submerged waves") causes pressure waves to be applied to a supply port, thus posing a risk of unstable discharge.

On the other hand, there has been known an inkjet recording apparatus (see, for example, Japanese Unexamined Patent Application Publication No. 2005-313384) including a line head having a plurality of nozzle heads provided side by side across the full width of a recording medium and in a direction parallel with the width of the recording medium, a main tank, placed outside the line head, in which ink is stored, an ink supply path through which the main tank is connected with each nozzle head and the ink is supplied out of the main tank to each of the nozzle heads, and a service tank provided in the line head and interposed in the ink supply path. The service tank has a rib placed between openings of downstream connections that are adjacent to each other in a space in the tank.

(for example, refer to Patent Literature 1).

Patent Literature 1: Japanese Unexamined Patent Application Publication No. 2005-313384

In the service tank described in Japanese Unexamined Patent Application Publication No. 2005-313384, blocking submerged waves with the rib makes it possible to inhibit the application of pressure waves to the supply port, but, for example, in the case of a service tank containing air and ink inside, the generation of waves on the liquid surface of ink (such waves being hereinafter referred to as "surface waves") cannot be inhibited with such a rib. It should be noted that generation of surface waves on the liquid surface of ink causes the liquid surface to move upward and downward, thus causing fluctuations in water pressure that is applied to the supply port and posting a risk of unstable discharge after all. Further, a detector may malfunction in detecting the liquid surface of ink.

Further, in a case where there is not sufficient liquid current inside the service tank, the physical properties of ink stored may undesirably become inhomogeneous.

For example, repetition of immediate supply to the printing unit of ink introduced into the service tank and stagnation of ink inside the service tank makes the physical properties of the ink inside the service tank tend to become inhomogeneous.

The present invention was made in view of the foregoing circumstances, and has as an object to provide a service tank that makes it possible to further homogenize the physical properties of ink inside the service tank and that makes it possible to attain stable discharge by reducing surface waves and submerged waves.

SUMMARY

The inventors diligently studied to attain the foregoing object. As a result, the inventors found that the foregoing object may be attained by attaching, to an internal space between an inlet and a supply port provided in a position closest to the inlet, a divider having a plate, an ink opening, and an air opening and by placing the plate in a proper area. Thus, the inventors accomplished the present invention.

The present invention is directed to a service tank used in an inkjet printing apparatus and configured to temporarily store ink introduced from an ink tank and directly supply the ink to a printing unit in a case where a liquid surface of the ink is in a proper area between an upper limit and a lower limit. The service tank includes a container having an internal space in which the ink is able to be stored, the container being provided with an inlet through which the ink is introduced into the internal space and a plurality of supply ports through which the ink stored in the internal space is supplied to each of a plurality of the printing units, a divider configured to divide the internal space into a plurality of compartments, and a detector configured to detect that the liquid surface of the ink stored in the internal space is at the upper limit or the lower limit. The divider is attached between the inlet and one of the supply ports provided in a position closest to the inlet. The divider includes a plate that prevents flow of the ink and air above the ink between adjacent ones of the compartments, an ink opening through which the ink flows between the adjacent compartments, and an air opening through which the air flows between the adjacent compartments. The plate is located in the proper area. The ink opening is located below the proper area. The air opening is located above the proper area.

Further, in the service tank, a proportion of an in-plane area of the ink opening to an in-plane area of a portion of the divider that is immersed in the ink in a case where the liquid surface of the ink stored is at the lower limit may be lower than or equal to 50%.

Further, in the service tank, a plurality of the dividers may be attached, at least one of the dividers may be attached between the inlet and one of the supply ports provided in a position closest to the inlet, and another of the dividers may be attached between ones of the supply ports that are adjacent to each other.

Further, in the service tank, the divider may further include an auxiliary ink opening through which the ink flows between the adjacent compartments, the ink opening may be provided either in a middle portion of the divider between upper and lower sides of a portion of the divider that is immersed in the ink in a case where the liquid surface of the ink stored is at the lower limit or above the middle portion, and the auxiliary ink opening may be provided at a lower level than the ink opening.

Further, the service tank may further include an auxiliary divider having a U shape in top view, the auxiliary divider being attached directly above one of the supply ports and composed of a basal portion, a left small piece provided on a left of the basal portion, and a right small piece provided at a right of the basal portion. The supply port may be located between the left small piece and the right small piece in top view.

Further, the service tank may further include a heater section attached to an outer surface of a side of the container and configured to heat the ink stored in the internal space. The auxiliary divider may be attached to an inner surface of the side. The side may be made of metal.

Further, the service tank may further include a heater section attached to an outer surface of a side of the container and configured to heat the ink stored in the internal space. The heater section may be attached so that a position of an upper end of the heater section falls within a range of 10 mm upward and 20 mm downward from a position on the outer surface of the side that corresponds to the lower limit of the liquid surface of the ink.

Further, in the service tank, the printing unit may include a solenoid valve attached to a base of the container so as to correspond to one of the supply ports, a supply tube communicating with the supply port via the solenoid valve, and a printing head attached to a lower end of the supply tube.

Further, in the service tank, a tube heater may be attached to the supply tube.

In the service tank of the present invention, providing a divider having an ink opening and an air opening is attached to the internal space between the inlet and one of the supply ports provided in a position closest to the inlet. This causes submerged waves based on the introduction of the ink through the inlet to be blocked by the plate of the divider, making it possible to inhibit pressure waves from being applied to the supply port.

It should be noted that the flow of the ink per se between compartments is not completely blocked, as the divider has the ink opening.

In the service tank of the present invention, surface waves based on the introduction of the ink are blocked by the plate of the divider too, as the plate of the divider is located in the proper area. This makes it possible to reduce fluctuations in water pressure due to upward and downward movements of the liquid surface. This also makes it possible to prevent the detector from malfunctioning.

All this allows the service tank to attain sufficiently stable discharge, as fluctuations in pressure at the supply ports can be reduced.

In the service tank of the present invention, attaching the dividers causes repetition of collisions of the ink with the plates and flow from the ink openings, thus making it possible to cause sufficient turbulence in the compartments. At this point in time, in the service tank, the proportion of the in-plane area of the ink opening to the in-plane area of the portion of the divider that is immersed in the ink in a case where the liquid surface of the ink stored is at the lower limit is made lower than or equal to 50%, whereby more sufficient turbulence can be caused in the compartments.

Further, the ink introduced into the service tank can be prevented from being immediately supplied to the printing unit.

This allows the service tank to further homogenize the physical properties of the ink stored.

In the service tank of the present invention, in addition to the divider attached between the inlet and the supply port provided in the position closest to the inlet, a divider is attached between ones of the supply ports that are adjacent to each other. This makes it possible to reduce fluctuations in pressure due to surface waves or submerged waves at each of the supply ports too.

Further, this also promotes turbulence of the ink, thus making it possible to reduce stagnation of the ink.

In the service tank of the present invention, the divider further includes an auxiliary ink opening, and placing the ink opening at a higher level and placing the auxiliary ink opening at a lower level causes upper and lower portions of the ink to be well mixed together. This makes it possible to further homogenize the physical properties of the ink.

Incidentally, variations in the distribution of density and temperature of the ink tend to occur as differences between upper and lower portions in ink liquid.

In the service tank of the present invention, the auxiliary divider is provided directly above one of the supply ports so that the supply port is located between the left small piece and the right small piece in top view. This makes it possible to further reduce fluctuations in pressure due to submerged waves at the supply port.

In the service tank of the present invention, further including a heater section on an outer surface of a side of the container makes it possible to heat the ink so that it is at a constant temperature. This makes it possible to reduce the occurrence of a case where the temperature of the ink varies on the basis of the difference in environment of inkjet printing.

Incidentally, a change in temperature of the ink leads to a change in amount of discharge. This may pose a risk of a change in density of printing.

At this point in time, the side is made of a metal that is superior in thermal conductivity. This makes it possible to improve the efficiency with which heat is applied.

Further, attaching the auxiliary divider to the inner surface of the side makes it possible to inhibit a portion of the ink that is heated earlier from being immediately supplied to the supply port and, by causing turbulence, further homogenize the physical properties of the ink stored.

In the service tank of the present invention, the heater section is attached so that the position of an upper end of the heater section falls within a range of 10 mm upward and 20 mm downward from a position on the outer surface of the side that corresponds to the lower limit of the liquid surface of the ink. This makes it possible to inhibit solidification of the ink adhering to the inner surface of the side of the service tank.

It should be noted that the lower limit of the liquid surface of the ink will be described later.

In the service tank of the present invention, the printing unit includes a solenoid valve, a supply tube, and a printing head. This makes it possible to quickly do inkjet printing using further homogenized ink.

At this point in time, attaching a tube heater to the supply tube makes it possible to prevent the ink from being cooled in flowing through the supply tube.

BRIEF DESCRIPTIONS OF THE DRAWINGS

FIG. 2(*b*) is a cross-sectional view of the service tank as taken along line X1-X1 shown in FIG. 2(*a*);

FIG. 2(*c*) is a cross-sectional view of the service tank as taken along line Y1-Y1 shown in FIG. 2(*a*);

FIG. 4(*b*) is an explanatory diagram for explaining an example of a liquid current in a case where no dividers are attached;

FIG. 5(*b*) is a cross-sectional view of the service tank as taken along line X2-X2 shown in FIG. 5(*a*);

FIG. 5(*c*) is a cross-sectional view of the service tank as taken along line Y2-Y2 shown in FIG. 5(*a*);

FIG. 7(*b*) is a cross-sectional view of the service tank as taken along line X3-X3 shown in FIG. 7(*a*); and FIG. 7(*c*) is a cross-sectional view of the service tank as taken along line Y3-Y3 shown in FIG. 7(*a*).

DETAILED DESCRIPTION

Figure 1:
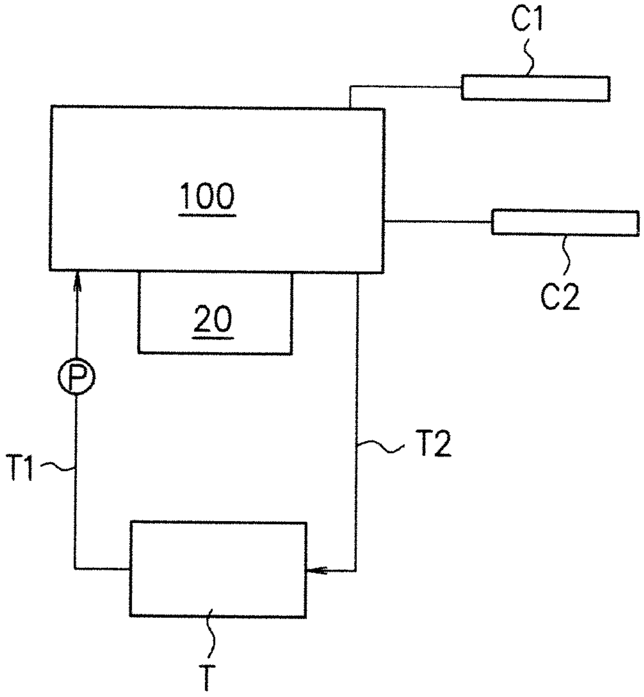
FIG. 1 is a schematic view for explaining the workings of a service tank according to a first embodiment in an inkjet printing apparatus.

In the following, preferred embodiments of the present invention are described in detail with reference to the drawings as needed. In the drawings, identical elements are assigned identical reference signs, and overlapping descriptions are omitted. Further, unless otherwise noted, positional relationships such as up, down, right, and left are based on positional relationships shown in the drawings. Furthermore, dimensional ratios of the drawings are not limited to ratios illustrated.

A service tank according to the present embodiment is used in an inkjet printing apparatus. Suitably employable examples of such inkjet printing apparatuses include, but are not limited to, on-demand inkjet printers such as piezo inkjet printers and thermal inkjet printers.

First Embodiment

First, a service tank according to a first embodiment of the present invention is described.

FIG. 1 is a schematic view for explaining the workings of the service tank according to the first embodiment in an inkjet printing apparatus.

As shown in FIG. 1, the service tank 100 according to the first embodiment is coupled to a printing section 20 composed of a plurality of printing units 20*a*, and is connected to a pressure control mechanism C1 configured to control the pressure of air in the service tank 100 and a control device C2 configured to control the amount of ink that is stored in the service tank 100.

It should be noted that the pressure control mechanism C1 and the control device C2 will be described later.

In the service tank 100, ink accommodated in an ink tank T is pumped up by a pump P and introduced via an inlet tube T1 into the service tank 100. It should be noted that the ink tank T is a tank that serves as an ink supply source.

The ink introduced into the service tank 100 is temporarily stored in the service tank 100 and directly supplied from the service tank 100 to the printing section 20.

Then, the printing section 20 discharges the ink thus supplied. In this way, inkjet printing is done on a printed medium (not illustrated).

Further, the ink stored in the service tank 100 is collected via a collecting tube T2 into the ink tank T.

Note here that the amount of ink that is supplied from the service tank 100 to the printing section 20 is controlled by the pressure control mechanism C1, and as mentioned above, the amount of ink that is stored in the service tank 100 is controlled by the control device C2.

Thus, in the service tank 100, the amount of ink that is stored and the amount of ink that is supplied can be controlled by temporarily storing ink. This makes it possible to prevent the printing section 20 from becoming short of ink.

Figure 2A:
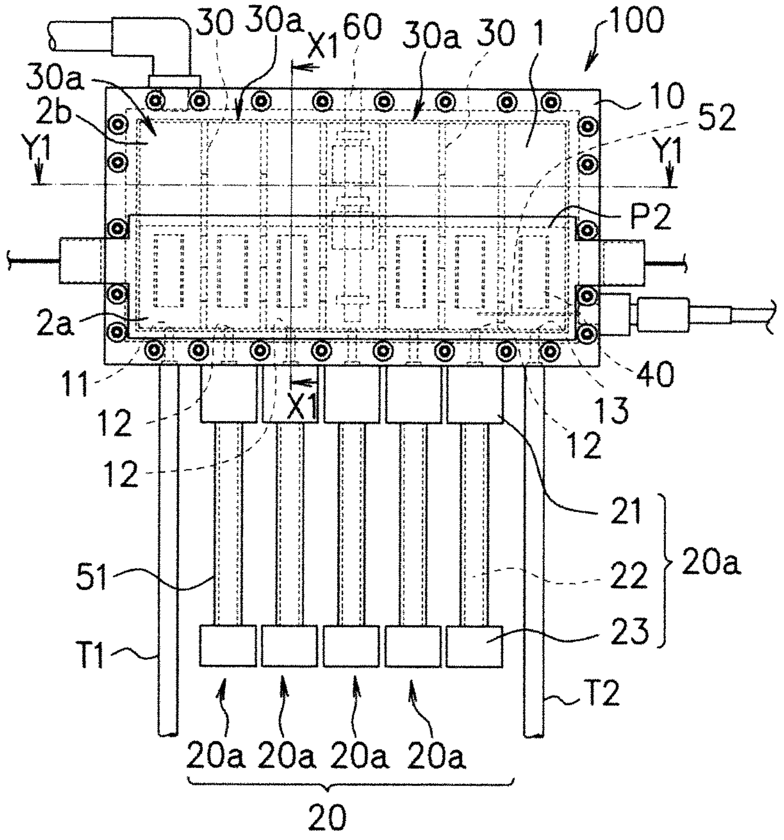
FIG. 2(*a*) is a see-through side view showing the service tank according to the first embodiment.
Figure 2B:
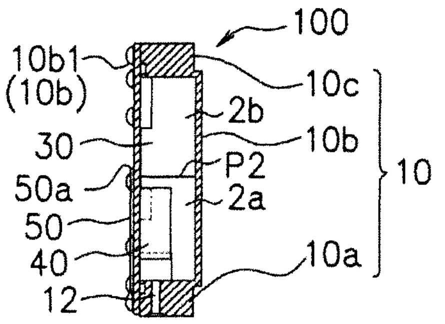
Figure 2C:
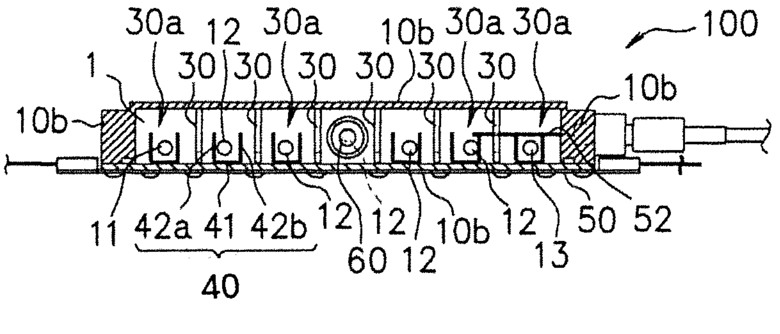

FIG. 2(*a*) is a see-through side view showing the service tank according to the first embodiment. FIG. 2(*b*) is a cross-sectional view of the service tank as taken along line X1-X1 shown in FIG. 2(*a*). FIG. 2(*c*) is a cross-sectional view of the service tank as taken along line Y1-Y1 shown in FIG. 2(*a*).

In FIGS. 2(*a*) to 2(*c*), ink 2*a* stored is seen through. In addition to this, FIG. 2(*b*) omits to illustrate the printing units 20*a* and the inlet tube T1.

As shown in FIGS. 2(*a*) to 2(*c*), the service tank 100 includes a container 10 having an internal space 1, a divider 30 configured to divide the internal space 1 into a plurality of compartments 30*a*, an auxiliary divider 40 provided directly above a supply port 12, a detector 60 configured to detect that the liquid surface of the ink 2*a* is at an upper limit P1 or a lower limit P2, and a heater section 50 attached to an outer surface of a side of the container 10.

Specifically, the service tank 100 is configured such that the internal space 1 is divided by six dividers 30 into seven compartments 30*a*.

In the service tank 100, when the ink 2*a* is introduced into the container 10, the ink 2*a* is stored in each of the compartments 30*a* of the internal space 1 and heated by the heater section 50.

It should be noted that the internal space 1 is not filled with the ink 2*a* but contains air 2*b* above the ink 2*a*.

Then, the ink 2*a* thus heated is supplied to the supply port 12.

Further, the ink 2*a* inside the service tank 100 is appropriately replenished as needed by the detector 60 detecting the position of the liquid surface of the ink 2*a*.

In the service tank 100, the container 10 has the shape of a box having a lower base (base) 10*a* that is rectangular in top view, four sides 10*b* standing at the four peripheral edges, respectively, of the lower base 10*a*, and an upper base 10*c* provided at the upper ends of the sides 10*b* (see FIG. 2(*b*)).

In the following, a direction parallel with a long side of the lower base 10*a* is herein referred to as "longitudinal direction", and a direction parallel with a short side of the lower base 10*a* as "transverse direction".

Moreover, an enclosed space surrounded by the lower base 10*a*, the sides 10*b*, and the upper base 10*c* is the aforementioned internal space 1.

Note here that the container 10 may have its lower base 10*a*, sides 10*b*, and upper base 10*c* in the form of a single entity or separate entities coupled to one another. It should be noted that the container 10 according to the first embodiment is molded such that the lower base 10*a*, three sides 10*b*, and the upper base 10*c* form a single entity (hereinafter also referred to as "body"), and is configured such that one side 10*b*1 (hereinafter also referred to as "lid") is bolted to the body via a gasket.

In the container 10, the lower base 10*a* is provided with an inlet 11 through which the ink 2*a* is introduced into the internal space 1, a plurality of the supply ports 12 through which the ink 2*a* stored in the internal space 1 is supplied to each of the plurality of printing units 20_a_, and a collecting port 13 through which the ink 2_a_ stored in the internal space 1 is collected. It should be noted that the inlet tube T1 is coupled to the inlet 11 and that the collecting tube T2 is coupled to the collecting port 13.

In the service tank 100, providing the inlet 11 in the lower base 10_a_ makes it possible to inhibit the ink 2_a_ from bubbling on impact of falling when introduced.

Further, providing the supply ports 12 in the lower base 10_a_ makes it possible to quickly supply the ink 2_a_ to the printing units 20_a_ using the force of gravity.

Further, providing the collecting port 13 in the lower base 10_a_ makes it possible to quickly collect the ink 2_a_ using the force of gravity.

In the container 10, the plurality of supply ports 12 are provided in the lower base 10_a_ so as to be placed at regular intervals from each other.

Moreover, the inlet 11 and the collecting port 13 are provided at both ends, respectively, of the lower base 10_a_ so as not to interfere with the plurality of supply ports 12. That is, the inlet 11, the plurality of supply ports 12, and the collecting port 13 are provided in this order in series along a longitudinal direction of the lower base 10_a_ (see FIG. 2(_c_)).

Further, inside the service tank 100, the ink 2_a_ introduced through the inlet 11 is either supplied to the plurality of supply ports 12 or collected through the collecting port 13. That is, inside the service tank 100, there is a liquid current of the ink 2_a_ from one end of the service tank 100 to the other.

In the service tank 100, the heater section 50 is attached to an outer surface of the lid 10_b_1 (one side 10_b_1) of the container 10 (see FIG. 2(_b_)).

At this point in time, it is preferable that the lid 10_b_1 be made of metal such as stainless steel, iron, or copper. In this case, heat generated by the heater section 50 can be efficiently transmitted to the ink 2_a_ stored in the internal space 1. It is more preferable that the lid 10_b_1 be made of such a material that the amount of change in physical property due to the influence of the ink 2_a_ in the service tank body is smaller than or equal to a predetermined amount.

Meanwhile, it is preferable, that the body be made of a material that is lower in thermal conductivity than the lid 10_b_1, although the material is not limited to particular materials. In this case, transmission of heat from the ink 2_a_ to the outside of the service tank 100 can be inhibited.

Specific examples of the material of which the body is made include, but are not limited to, glass, rubber, and resin. Among them, resin is suitably used, as it is inexpensive and highly durable.

Examples of such resin include vinyl chloride resin, polycarbonate resin, polyacetal resin, fluorine resin, acrylic resin, and polyamide resin. It is more preferable that the body be made of such a material that the amount of change in physical property due to the influence of the ink 2_a_ in the service tank body is smaller than or equal to a predetermined amount.

Accordingly, in the service tank 100, the lid 10_b_1 and the body, which are made of the aforementioned materials, bring about further improvement in efficiency in the transmission of heat to the ink 2_a_.

As the heater section 50, a rubber heater, a band heater, or other heaters may be employed.

In the service tank 100, the heater section 50 heats the ink 2_a_ stored in the internal space 1 so that it is at a constant temperature, thereby making it possible to reduce the occurrence of a case where the temperature of the ink 2_a_ varies on the basis of the difference in environment of inkjet printing.

Further, in the service tank 100, the internal space 1 is provided with ink temperature detecting means, such as a thermocouple, a resistance thermometer sensor, or a thermistor, configured to detect the temperature of the ink 2_a_ and a control device (not illustrated) that sends an operation command to the heater section 50 on the basis of the temperature detected by the ink temperature detecting means. In the service tank 100 according to the first embodiment, a thermocouple 52 is employed as the ink temperature detecting means. For this reason, in the service tank 100, the temperature of the ink 2_a_ inside the service tank 100 can be held as constant as possible by controlling the temperature of the ink 2_a_ inside so that it is a set temperature.

Note here that it is preferable that the heater section 50 be attached so that the position of an upper end 50_a_ of the heater section 50 falls within a range of 10 mm upward and 20 mm downward from a position on the outer surface of the lid 10_b_1 that corresponds to the lower limit P2 of the liquid surface of the ink 2_a_. This makes it possible to sufficiently heat the ink 2_a_ inside the service tank 100 and inhibit solidification of the ink 2_a_ adhering to an inner surface of the lid 10_b_1 of the service tank 100.

It should be noted that the lower limit P2 of the liquid surface of the ink 2_a_ will be described later.

In the service tank 100, the dividers 30 divide the internal space 1 into the plurality of compartments 30_a_, which are divided from one another by surfaces perpendicular to the longitudinal direction.

At this point in time, each of the dividers 30 is attached separately between the inlet 11 and one of the supply ports 12 provided in a position closest to the inlet 11, between ones of the supply ports 12 that are adjacent to each other, or between the collecting port 13 and one of the supply ports 12 provided in a position closest to the collecting port 13. That is, each of the compartments 30_a_ has at least one of the inlet 11, the plurality of supply ports 12, and the collecting port 13.

It should be noted that these dividers 30 have common structures.

Further, the dividers 30 restrict the flow of the ink 2_a_ and the air 2_b_ between one of the compartments 30_a_ to another. For this reason, in the service tank 100, attaching a divider 30 between the inlet 11 and one of the supply ports 12 provided in a position closest to the inlet 11 causes submerged waves based on the introduction of the ink 2_a_ through the inlet 11 to be blocked by the divider 30 (plate 31), making it possible to inhibit pressure waves from being applied to the supply port 12.

Further, attaching dividers 30 also between ones of the supply ports 12 that are adjacent to each other and between the collecting port 13 and one of the supply ports 12 provided in a position closest to the collecting port 13 makes it possible to reduce fluctuations in pressure due to submerged waves at each of the supply ports 12.

All this makes it possible to attain stable discharge in the printing units 20_a_.

Figure 3:
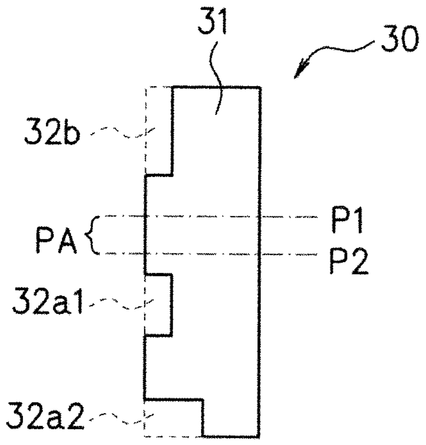
FIG. 3 is a side view showing a divider of the service tank according to the first embodiment.

FIG. 3 is a side view showing a divider of the service tank according to the first embodiment.

As shown in FIG. 3, the divider 30 includes a plate 31 that prevents the flow of the ink 2_a_ and the air 2_b_ above the ink 2_a_ between adjacent compartments 30_a_, an ink opening 32_a_1 and an auxiliary ink opening 32_a_2 through which only the ink 2_a_ flows between the adjacent compartments 30_a_, and an air opening 32_b_ through which only the air 2_b_ flows between the adjacent compartments 30_a_.

In the divider 30, the plate 31 is located in the after-mentioned proper area PA, and has the shape of a plate projecting upward and downward from the proper area PA. For this reason, the air 2*b* and the ink 2*a* in the proper area PA are blocked by the plate 31 from flowing between the adjacent compartments 30*a*. As a result, in the service tank 100, surface waves based on the introduction of the ink 2*a* into the service tank 100 are blocked by the plate 31. This makes it possible to inhibit each of the supply ports 12 from being affected by fluctuations in water pressure due to upward and downward movements of the liquid surface.

This also makes it possible to prevent the after-mentioned detector 60 from malfunctioning.

Accordingly, the service tank 100 makes it possible to attain more stable discharge in the printing units 20*a*.

In the divider 30, the ink opening 32*al* is not located in the proper area PA but located below the lower limit P2. Specifically, the ink opening 32*al* is provided either in a middle portion of the divider 30 between the upper and lower sides of a portion of the divider 30 that is immersed in the ink 2*a* in a case where the liquid surface of the ink 2*a* stored is at the lower limit P2 or above the middle portion. This makes it possible to inhibit the ink 2*a* from being supplied through the supply port 12 immediately after being introduced.

Further, the auxiliary ink opening 32*a*2 is provided at a lower level than the ink opening 32*a*1.

In the service tank 100, providing the ink opening 32*al* at a higher level and providing the auxiliary ink opening 32*a*2 at a lower level causes upper and lower portions of the ink 2*a* to be mixed together, thus making it possible to further reduce stagnation of the ink 2*a*.

Further, the auxiliary ink opening 32*a*2, which is provided in contact with the bottom of the internal space 1, makes it possible to, for example, in cleaning the inside of each of the compartments 30*a* of the service tank 100, exhaust the ink 2*a* in each of the compartments 30*a* and a cleaning fluid from one collecting port 13 via the auxiliary ink opening 32*a*2. This advantageously makes, for example, cleaning easy.

Note here that it is preferable that the proportion of the in-plane area of the ink opening 32*a*1 to the in-plane area of the portion that is immersed in the ink 2*a* in a case where the liquid surface of the ink 2*a* stored is at the lower limit P2 be lower than or equal to 50%, more preferably lower than or equal to 25%. This makes it possible to cause more sufficient turbulence in the compartments 30*a*.

Figure 4A:
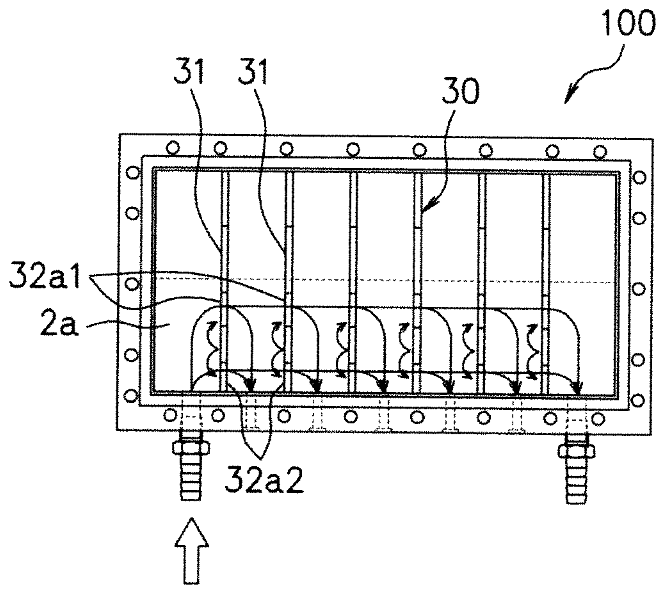
FIG. 4(*a*) is an explanatory diagram for explaining an example of a liquid current in the service tank according to the first embodiment.
Figure 4B:
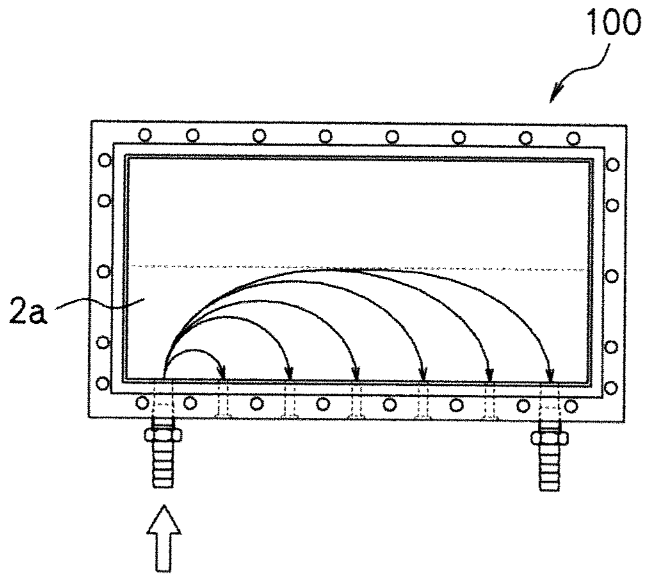

FIG. 4(*a*) is an explanatory diagram for explaining an example of a liquid current in the service tank according to the first embodiment. FIG. 4(*b*) is an explanatory diagram for explaining an example of a liquid current in a case where no dividers are attached.

As shown in FIG. 4(*a*), in the service tank 100, attaching the dividers 30 causes repetition of collisions of the ink 2*a* with the plates 31 and flow from the ink openings 32*a*1 and the auxiliary ink openings 32*a*2, thus making it possible to cause more sufficient turbulence in the compartments 30*a*.

On the other hand, as shown in FIG. 4(*b*), in a case where there are no dividers 30, the ink 2*a* tends to stagnate in a higher position or at ends, as the ink 2*a* does not collide with plates 31.

For this reason, the service tank 100 makes it possible to further homogenize the physical properties, such as particle size, particle diameter, density, and temperature, of the ink 2*a* stored.

With continued reference to FIG. 3, in the divider 30, the air opening 32*b* is not located in the proper area PA but located above the proper area PA.

This makes it possible to simultaneously extend the control of pressure by the pressure control mechanism C1 to all compartments 30*a* via the air openings 32*b*.

Note here that the ink openings 32*al* and the auxiliary ink openings 32*a*2 are not limited to particular shapes, provided the ink 2*a* can flow through them and that the air openings 32*b* are not limited to particular shapes, provided the air 2*b* can pass through them. Further, they may take the shape of notches or holes.

In the service tank 100 according to the first embodiment, portions of the plates 31 notched in the shape of rectangles in side view are employed as the ink openings 32*a*1, the auxiliary ink openings 32*a*2, and the air openings 32*b*.

With continued reference to FIGS. 2(*a*) to 2(*c*), in the service tank 100, an auxiliary divider 40 is provided directly above each of the inlet 11, the plurality of supply ports 12, and the collecting port 13.

This makes it possible to further inhibit fluctuations in pressure due to submerged waves from being transmitted to the supply ports 12.

It should be noted that these auxiliary dividers 40 have common structures.

The auxiliary divider 40 has a U shape in top view, and is composed of a basal portion 41, a left small piece 42*a* provided on the left of the basal portion 41, and a right small piece 42*b* provided on the right of the basal portion 41 (see FIG. 2(*c*)).

Further, the auxiliary divider 40 is placed so that the supply port 12 is located between the left small piece 42*a* and the right small piece 42*b* in top view.

At this point in time, in the auxiliary divider 40, the basal portion 41 is attached to the inner surface of the lid 10*b*1 (one side 10*b*1). This makes it possible to inhibit a portion of the ink 2*a* that is heated by the heater section 50 earlier from being immediately supplied to the supply port 12 or the collecting port 13 and, by causing turbulence, further homogenize the physical properties of the ink 2*a* stored.

It is preferable that as is the case with the aforementioned lid 10*b*1, the auxiliary divider 40 be made of metal such as stainless steel, an iron, or copper. In this case, heat generated by the heater section 50 can be efficiently transmitted to the ink 2*a* stored in the internal space 1.

It should be noted that the lid 10*b*1 and the auxiliary divider 40 may be made of the same material as each other or be made of different materials from each other.

It is more preferable that the auxiliary divider 40 be made of such a material that the amount of change in physical property due to the influence of the ink 2*a* in the service tank body is smaller than or equal to a predetermined amount.

In the service tank 100, the detector 60 detects that the liquid surface of the ink 2*a* stored in the internal space 1 is at the upper limit P1 or the lower limit P2.

The term "upper limit P1" here means the position of the liquid surface at the time when the amount of ink 2*a* that is stored in the service tank 100 when printing is done is at its maximum. The term "lower limit P2" here means the position of the liquid surface at the time when the amount of ink 2*a* that is stored in the service tank 100 when printing is done is at its minimum.

Further, the proper area PA is an area between a case where the liquid surface of the ink 2*a* is at the upper limit P1 and a case where the liquid surface of the ink 2*a* is at the lower limit P2. That is, the liquid surface of the ink 2*a* during printing is in the proper area PA.

It should be noted that the positions of the upper limit P1 and the lower limit P2 can be arbitrarily set.

The detector 60 needs only be capable of detecting at least either the upper limit P1 or the lower limit P2.

For example, in detecting the upper limit P1, it is only necessary to repeat a series of operations of starting printing from a state in which the liquid surface of the ink 2*a* is at the upper limit P1 and, after a certain period of time elapses, introducing the ink 2*a* until the liquid surface of the ink 2*a* reaches the upper limit P1.

Further, in detecting the lower limit P2, it is only necessary to repeat a series of operations of doing printing until the liquid surface of the ink 2*a* reaches the lower limit P2 and, once the liquid surface of the ink 2*a* reaches the lower limit P2, introducing a certain amount of ink 2*a*.

In the service tank 100 according to the first embodiment, the detector 60 detects the latter lower limit P2.

Note here that a float switch is employed as the detector 60, although the detector 60 is not limited as long as it is capable of detecting the upper limit P1 or the lower limit P2.

As mentioned above, the float switch is capable of detecting that the liquid surface of the ink 2*a* is at the lower limit P2. Further, in addition to this, as a safety measure to be taken in the event of an error in the introduction or collection of the ink 2*a*, the float switch is capable of detecting an upper safety point at which to prevent the service tank 100 from becoming filled up and a lower safety point at which to prevent the service tank 100 from becoming empty.

The control device C2 is a device configured to control the amount of ink 2*a* stored in the internal space 1.

The control device C2 is a common computer including at least a central processing unit (CPU), an arithmetic processing unit, a storage unit, an image processing unit, and an input and output unit (keyboard, display), or other components.

Upon receiving a detection signal based on the detector 60 having detected that the liquid surface of the ink 2*a* is at the lower limit P2, the control device C2 sends a command to introduce a certain amount of ink 2*a* into the service tank 100. This drives the pump P to cause the ink 2*a* inside the ink tank T to be introduced into the service tank 100 through the inlet 11 (see FIG. 1).

The pressure control mechanism C1 is intended to control the amount of supply of the ink 2*a* from the service tank 100 to the printing units 20*a* by controlling the pressure of the air 2*b* stored in the internal space 1.

The pressure control mechanism C1 includes a pressure adjustment device configured to increase or decrease the pressure of the air 2*b* in the internal space 1, an open valve configured to make the pressure of the air 2*b* in the internal space 1 equal to atmospheric pressure, and a barometer configured to measure the pressure of the internal space 1.

In the pressure control mechanism C1, the pressure of the air 2*b* in the internal space 1 can be measured by the barometer and be increased or decreased by the pressure adjustment device accordingly.

This makes it possible, for example, to, during printing or during storage of a printing head 23, control the pressure of the air 2*b* so that it is decreased to a negative pressure for the prevention of excessive supply or leakage of the ink 2*a* with the force of gravity and to, during purging, control the pressure of the air 2*b* so that it is increased to a positive pressure for the elimination of defective discharge by forcible ejection of the ink 2*a* from the printing head 23.

It is preferable to, in transition from a negative pressure to a positive pressure or vice versa, temporarily attain atmospheric pressure via an air filter in the middle.

It should be noted that suitably usable examples of the pressure adjustment device include a compressor, a vacuum pump, a tube pump, and a diaphragm pump.

The printing section 20 is attached to a lower surface of the service tank 100.

The printing section 20 is composed of the plurality of printing units 20*a*.

Moreover, the printing units 20*a* are each composed of a solenoid valve 21 attached to a base (lower base 10*a*) of the container 10 so as to correspond to a supply port 12 of the service tank 100, a supply tube 22 communicating with the supply port 12 via the solenoid valve 21, and a printing head 23 attached to a lower end of the supply tube 22. This makes it possible to surely do inkjet printing using further homogenized ink 2*a*.

The printing heads 23 can be of a serial head type or a line head type. It should be noted that the printing heads 23 of the printing units 20*a* attached to the service tank 100 according to the first embodiment are of a line head type.

Further, in the printing unit 20*a*, a tube heater 51 is attached to the supply tube 22. This makes it possible to prevent the ink 2*a* from being cooled in flowing through the supply tube 22.

Second Embodiment

Next, a service tank according to a second embodiment of the present invention is described.

The workings of the service tank according to the second embodiment in an inkjet printing apparatus are not described here, as the workings are the same as those of the service tank 100 according to the first embodiment shown in FIG. 1.

Figure 5A:
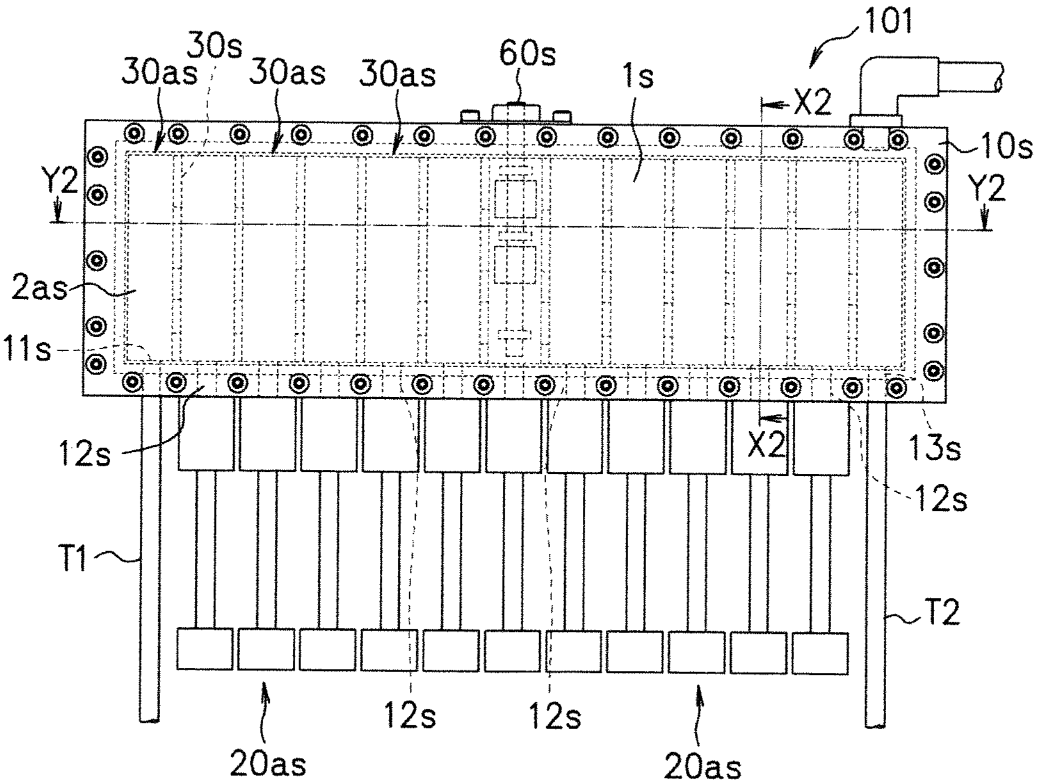
FIG. 5(*a*) is a see-through side view showing a service tank according to a second embodiment.
Figure 5B:
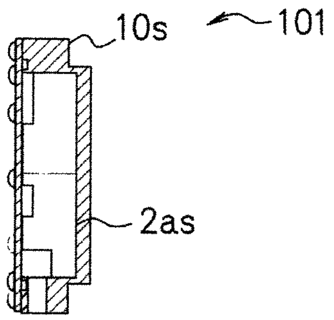
Figure 5C:
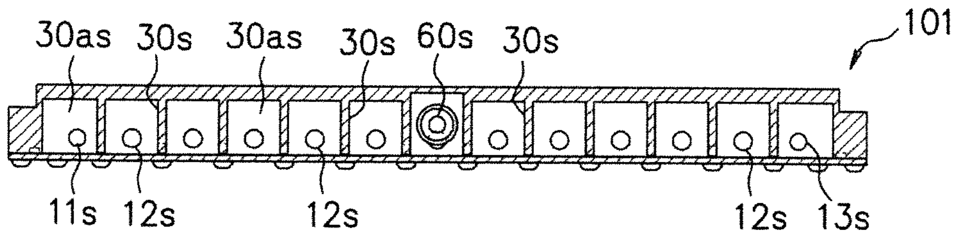

FIG. 5(*a*) is a see-through side view showing the service tank according to the second embodiment. FIG. 5(*b*) is a cross-sectional view of the service tank as taken along line X2-X2 shown in FIG. 5(*a*). FIG. 5(*c*) is a cross-sectional view of the service tank as taken along line Y2-Y2 shown in FIG. 5(*a*).

In FIG. 5(*a*) to 5(*c*), ink 2*as* stored is seen through.

In addition to this, FIG. 5(*b*) omits to illustrate printing units 20*as* and the inlet tube T1.

As shown in FIG. 5(*a*) to 5(*c*), the service tank 101 includes a container 10*s* having an internal space 1*s*, a divider 30*s* configured to divide the internal space 1*s* into a plurality of compartments 30*as*, and a detector 60*s* configured to detect that the liquid surface of the ink 2*as* is at an upper limit P1 or a lower limit P2 (see FIG. 3).

That is, the service tank 101 according to the second embodiment differs from the service tank 100 according to the first embodiment in that the internal space 1*s* is divided by twelve dividers 30*s* into thirteen compartments 30*as*.

Further, in addition to this, the service tank 101 according to the second embodiment differs from the service tank 100 according to the first embodiment in that the service tank 101 does not include an auxiliary divider 40 or a heater section 50.

A detailed description of configurations other than these differences is omitted, as the configurations are the same as those of the service tank 100 according to the first embodiment.

In the service tank 101, as in the case of the service tank 100 according to the first embodiment, the physical properties of the ink 2*as* inside the service tank 101 can be further homogenized by attaching each of the dividers 30*as* separately to the internal space 1*s* between the inlet 11*s* and one of the supply ports 12*s* provided in a position closest to the inlet 11*s*, between ones of the supply ports 12*s* that are adjacent to each other, or between the collecting port 13*s* and one of the supply ports 12*s* provided in a position closest to the collecting port 13*s* and placing the plates 31 in the proper area PA, and stable discharge can be attained by reducing surface waves and submerged waves (see FIG. 3).

Third Embodiment

Next, a service tank according to a third embodiment of the present invention is described.

Figure 6:
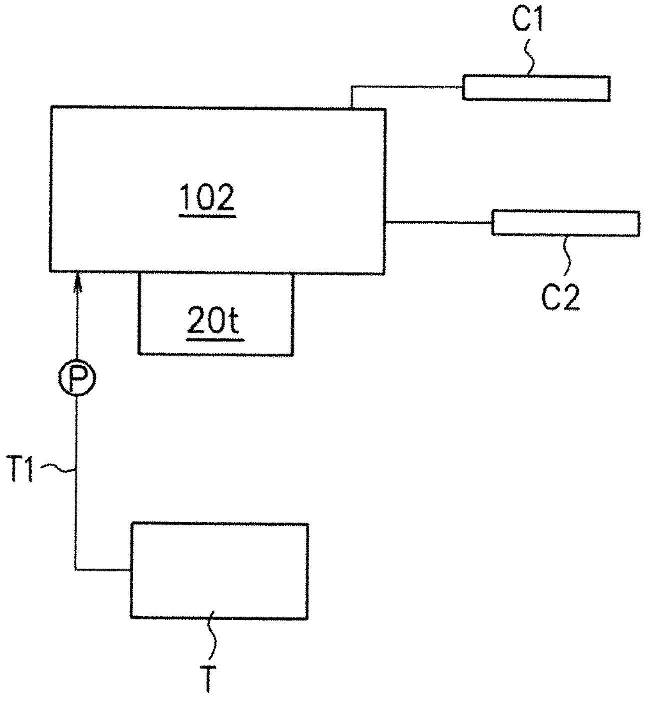
FIG. 6 is a schematic view for explaining the workings of a service tank according to a third embodiment in an inkjet printing apparatus.

FIG. 6 is a schematic view for explaining the workings of the service tank according to the third embodiment in an inkjet printing apparatus.

As shown in FIG. 6, the service tank 102 according to the third embodiment is coupled to a printing section 20*t*, and is connected to a pressure control mechanism C1 configured to control the pressure of air in the service tank 102 and a control device C2 configured to control the amount of ink that is stored in the service tank 102.

In the service tank 102, ink accommodated in an ink tank T is pumped up by a pump P and introduced via an inlet tube T1 into the service tank 102.

The ink introduced into the service tank 102 is temporarily stored in the service tank 102 and directly supplied from the service tank 102 to the printing section 20*t*.

Then, the printing section 20*t* discharges the ink thus supplied. In this way, inkjet printing is done on a printed medium (not illustrated).

In this case, the inkjet printing apparatus do not have a collecting tube T2. That is, the service tank 102 does not have a collecting port. For this reason, the ink stored in the service tank 102 is only supplied to the printing section 20*t*, and is not collected.

Figure 7A:
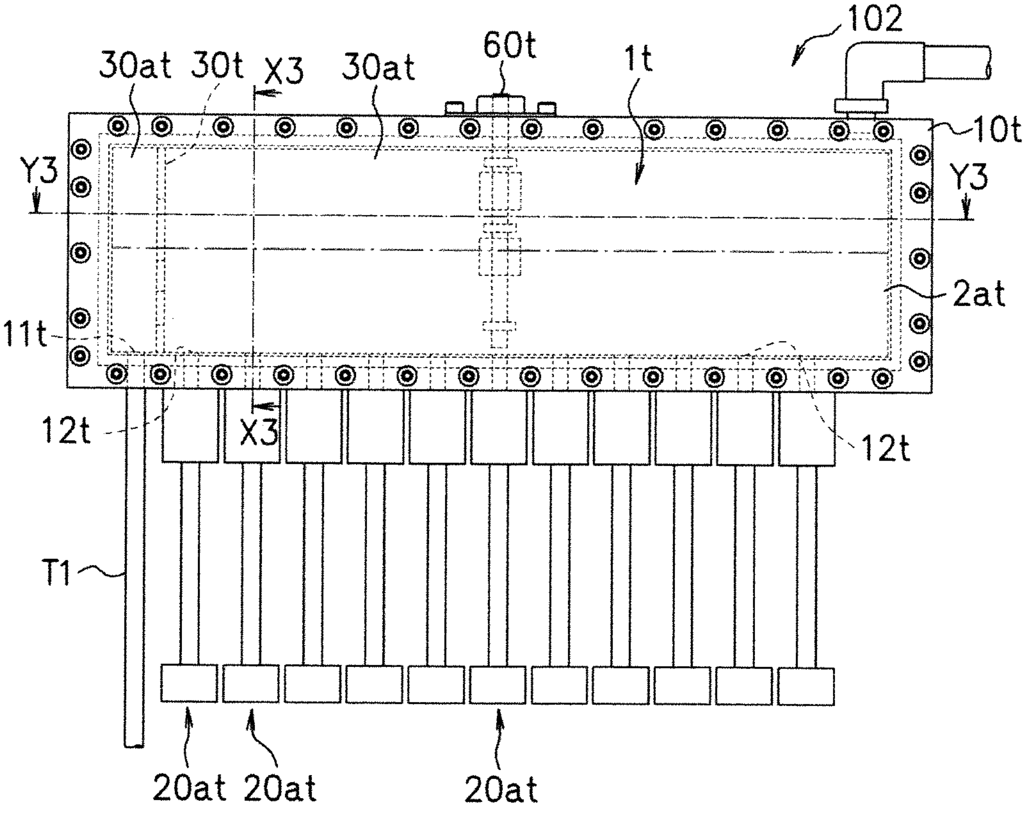
FIG. 7(*a*) is a see-through side view showing the service tank according to the third embodiment.
Figure 7B:
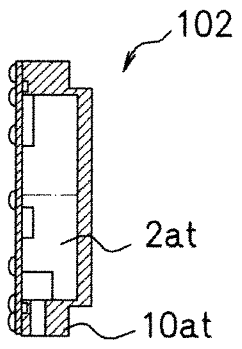
Figure 7C:
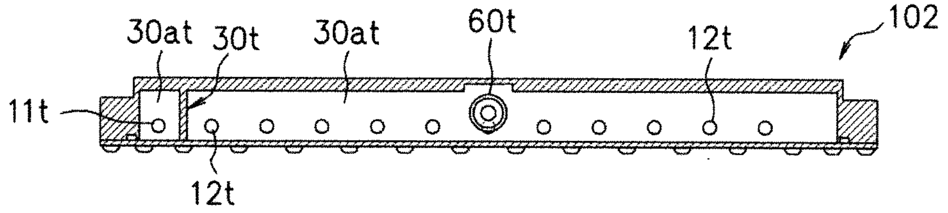

FIG. 7(*a*) is a see-through side view showing the service tank according to the third embodiment. FIG. 7(*b*) is a cross-sectional view of the service tank as taken along line X3-X3 shown in FIG. 7(*a*). FIG. 7(*c*) is a cross-sectional view of the service tank as taken along line Y3-Y3 shown in FIG. 7(*a*).

In FIGS. 7(*a*) to 7(*c*), ink 2*at* stored is seen through.

In addition to this, FIG. 7(*b*) omits to illustrate printing units 20*at* and the inlet tube T1.

As shown in FIGS. 7(*a*) to 7(*c*), the service tank 102 includes a container 10*t* having an internal space 1*t*, a divider 30*t* configured to divide the internal space 1*t* into a plurality of compartments 30*at*, and a detector 60*t* configured to detect that the liquid surface of the ink 2*at* is at an upper limit P1 or a lower limit P2 (see FIG. 3).

That is, the service tank 102 according to the third embodiment differs from the service tank 100 according to the first embodiment in that the internal space it is divided by one divider 30*t* into two compartments 30*at*.

Further, in addition to this, the service tank 102 according to the third embodiment differs from the service tank 100 according to the first embodiment in that the container 10*t* is not provided with a collecting port 13 and that the service tank 102 does not include an auxiliary divider 40 or a heater section 50.

A detailed description of configurations other than these differences is omitted, as the configurations are the same as those of the service tank 100 according to the first embodiment.

In the container 10*t*, the lower base 10*at* is provided with an inlet 11*t* through which the ink 2*at* is introduced into the internal space 1*t* and a plurality of the supply ports 12*t* through which the ink 2*at* stored in the internal space 1*t* is supplied to each of the plurality of printing units 20*at*.

It should be noted that the inlet tube T1 is coupled to the inlet 11*t*.

Further, in the container 10*t*, the plurality of supply ports 12*t* are provided in the lower base 10*at* so as to be placed at regular intervals from each other.

Moreover, the inlet 11*t* is provided at one end of the lower base 10*at* so as not to interfere with the plurality of supply ports 12*t*. That is, the inlet 11*t* and the plurality of supply ports 12*t* are provided in this order in series along a longitudinal direction of the lower base 10*at* (see FIG. 7(*c*)).

In the service tank 102, as in the case of the service tank 100 according to the first embodiment, the physical properties of the ink 2*at* inside the service tank 102 can be further homogenized by attaching the divider 30*t* to the internal space 1*t* between the inlet 11*t* and one of the supply ports 12*t* provided in a position closest to the inlet 11*t* and placing the plate 31 in the proper area PA and stable discharge can be attained by reducing surface waves and submerged waves (see FIG. 3).

In the foregoing, preferred embodiments of the present invention have been described. However, the present invention is not limited to the foregoing embodiments.

In the service tank 100 according to the first embodiment, ink accommodated in the ink tank T is directly introduced. Alternatively, the ink may be introduced from the ink tank T into the service tank via a filter, a heating device, a deaeration device, or other devices.

In the service tank 100 according to the first embodiment, the container 10 has the shape of a box having a lower base 10*a* that is rectangular in top view, four sides 10*b* standing at the four peripheral edges, respectively, of the lower base 10*a*, and an upper base 10*c* provided at the upper ends of the sides 10*b*. However, this is not intended to impose any limitation. The container 10 may have the shape of, for example, a hexagonal prism or an elliptic cylinder, provided a divider can be attached to the internal space.

In the service tank 100 according to the first embodiment, the lower base 10*a* is provided with the inlet 11 and the collecting port 13. However, this is not intended to impose any limitation.

For example, the inlet 11 and the collecting port 13 may be provided in a side that is immersed in the ink stored.

In the service tank 100 according to the first embodiment, the plurality of supply ports 12 are provided in the lower base 10*a* so as to be placed at regular intervals from each other, and the inlet 11 and the collecting port 13 are provided at both ends, respectively, of the lower base 10*a* so as not to interfere with the plurality of supply ports 12. However, this is not essential.

Further, although the inlet 11, the plurality of supply ports 12, and the collecting port 13 are provided in this order in series along a longitudinal direction of the lower base 10*a*, this is not essential.

For example, the inlet may be located in the aforementioned side or may be located between supply ports arrayed. Further, the supply ports may be provided not in series but in parallel.

In the service tank 100 according to the first embodiment, a plurality of the dividers 30 attached to the internal space 1 have common structures. However, this is not essential. For example, they may be different in position and size of air openings and ink openings from each other.

In the service tank 100 according to the first embodiment, the divider 30 includes a plate 31, an ink opening 32*al* and an auxiliary ink opening 32*a*2, and an air opening 32*b*. However, the auxiliary ink opening 32*a*2 is not essential.

In the service tank 100 according to the first embodiment, the auxiliary ink opening 32*a*2 is provided in contact with the bottom of the internal space 1. Alternatively, the auxiliary ink opening 32*a*2 may be provided in a position at a distance from the bottom.

Further, the divider 30 may further include an opening in addition to the ink opening 32*al*, the auxiliary ink opening 32*a*2, and the air opening 32*b*.

In the service tank 100 according to the first embodiment, the printing units 20*a* are each composed of a solenoid valve 21, a supply tube 22, and a printing head 23. However, they are not limited to this configuration, provided they are capable of inkjet printing.

Further, although a tube heater 51 is attached to the supply tube 22, this is not essential.

A service tank of the present invention is used in an inkjet printing apparatus. Specifically, the service tank is used in an inkjet printing apparatus as a service tank configured to temporarily store ink introduced from an ink tank and supply the ink directly to a printing unit.

The service tank of the present invention makes it possible to further homogenize the physical properties of ink inside the service tank and, by reducing surface waves and submerged waves, attain stable discharge.

What is claimed is:

1. A service tank used in an inkjet printing apparatus and configured to temporarily store ink introduced from an ink tank and directly supply the ink to a printing unit in a case where a liquid surface of the ink is in a proper area between an upper limit and a lower limit, the service tank comprising:

a container having an internal space in which the ink is able to be stored, the container being provided with an inlet through which the ink is introduced into the internal space and a plurality of supply ports through which the ink stored in the internal space is supplied to each of a plurality of the printing units;

a divider configured to divide the internal space into a plurality of compartments;

a detector configured to detect that the liquid surface of the ink stored in the internal space is at the upper limit or the lower limit; and an auxiliary divider having a U shape in top view, the auxiliary divider being attached directly above one of the supply ports and composed of a basal portion, a left small piece provided on a left of the basal portion, and a right small piece provided at a right of the basal portion;

wherein:

the divider is attached between the inlet and one of the supply ports provided in a position closest to the inlet;

the divider includes a plate that prevents flow of the ink and air above the ink between adjacent ones of the compartments, an ink opening through which the ink flows between the adjacent compartments, and an air opening through which the air flows between the adjacent compartments;

the plate is located in the proper area;

the ink opening is located below the proper area;

the air opening is located above the proper area; and the supply port is located between the left small piece and the right small piece in top view.

2. The service tank according to claim 1, wherein the printing unit includes a solenoid valve attached to a base of the container so as to correspond to one of the supply ports, a supply tube communicating with the supply port via the solenoid valve, and a printing head attached to a lower end of the supply tube.

3. The service tank according to claim 1, further comprising a heater section attached to an outer surface of a side of the container and configured to heat the ink stored in the internal space, and the auxiliary divider is attached to an inner surface of the side, and the side is made of metal.

4. The service tank according to claim 3, wherein a tube heater is attached to a supply tube.

5. The service tank according to claim 3, wherein a proportion of an in-plane area of the ink opening to an in-plane area of a portion of the divider that is immersed in the ink, in a case where the liquid surface of the ink stored is at the lower limit, is lower than or equal to 50%.

6. The service tank according to claim 3, wherein:

a plurality of the dividers are provided;

at least one of the dividers is attached between the inlet and one of the supply ports provided in a position closest to the inlet; and another of the dividers is attached between ones of the supply ports that are adjacent to each other.

7. The service tank according to claim 3, wherein:

a proportion of an in-plane area of the ink opening to an in-plane area of a portion of the divider that is immersed in the ink, in a case where the liquid surface of the ink stored is at the lower limit, is lower than or equal to 50%;

a plurality of the dividers are provided;

at least one of the dividers is attached between the inlet and one of the supply ports provided in a position closest to the inlet; and another of the dividers is attached between ones of the supply ports that are adjacent to each other.

8. The service tank according to claim 3, wherein:

the divider further includes an auxiliary ink opening through which the ink flows between the adjacent compartments;

the ink opening is provided either in a middle portion of the divider between upper and lower sides of a portion of the divider that is immersed in the ink in a case where the liquid surface of the ink stored is at the lower limit or above the middle portion; and the auxiliary ink opening is provided at a lower level than the ink opening.

9. A service tank used in an inkjet printing apparatus and configured to temporarily store ink introduced from an ink tank and directly supply the ink to a printing unit in a case where a liquid surface of the ink is in a proper area between an upper limit and a lower limit, the service tank comprising:

a container having an internal space in which the ink is able to be stored, the container being provided with an inlet through which the ink is introduced into the internal space and a plurality of supply ports through which the ink stored in the internal space is supplied to each of a plurality of the printing units;

a divider configured to divide the internal space into a plurality of compartments;

a detector configured to detect that the liquid surface of the ink stored in the internal space is at the upper limit or the lower limit; and a heater section attached to an outer surface of a side of the container and configured to heat the ink stored in the internal space;

wherein:

the divider is attached between the inlet and one of the supply ports provided in a position closest to the inlet;

the divider includes a plate that prevents flow of the ink and air above the ink between adjacent ones of the compartments, an ink opening through which the ink flows between the adjacent compartments, and an air opening through which the air flows between the adjacent compartments;

the plate is located in the proper area;

the ink opening is located below the proper area;

the air opening is located above the proper area; and the heater section is attached so that a position of an upper end of the heater section falls within a range of 10 mm upward and 20 mm downward from a position on the outer surface of the side that corresponds to the lower limit of the liquid surface of the ink.

10. The service tank according to claim 9, wherein the printing unit includes a solenoid valve attached to a base of the container so as to correspond to one of the supply ports, a supply tube communicating with the supply port via the solenoid valve, and a printing head attached to a lower end of the supply tube.

11. The service tank according to claim 10, further comprising:

an auxiliary divider having a U shape in top view, the auxiliary divider being attached directly above one of the supply ports and composed of a basal portion, a left small piece provided on a left of the basal portion, and a right small piece provided at a right of the basal portion;

wherein:

the supply port is located between the left small piece and the right small piece in top view; and the auxiliary divider is attached to an inner surface of the side and the side is made of metal.

12. A service tank used in an inkjet printing apparatus and configured to temporarily store ink introduced from an ink tank and directly supply the ink to a printing unit in a case where a liquid surface of the ink is in a proper area between an upper limit and a lower limit, the service tank comprising:

a container having an internal space in which the ink is able to be stored, the container being provided with an inlet through which the ink is introduced into the internal space and a plurality of supply ports through which the ink stored in the internal space is supplied to each of a plurality of the printing units;

a divider configured to divide the internal space into a plurality of compartments; and a detector configured to detect that the liquid surface of the ink stored in the internal space is at the upper limit or the lower limit;

wherein:

the divider is attached between the inlet and one of the supply ports provided in a position closest to the inlet, the divider includes a plate that prevents flow of the ink and air above the ink between adjacent ones of the compartments, an ink opening through which the ink flows between the adjacent compartments, an air opening through which the air flows between the adjacent compartments, and an auxiliary ink opening through which the ink flows between the adjacent compartments;

the plate is located in the proper area;

the ink opening is located below the proper area;

the air opening is located above the proper area;

the ink opening is provided either in a middle portion of the divider between upper and lower sides of a portion of the divider that is immersed in the ink in a case where the liquid surface of the ink stored is at the lower limit or above the middle portion;

the auxiliary ink opening is provided at a lower level than the ink opening; and the printing unit includes a solenoid valve attached to a base of the container so as to correspond to one of the supply ports, a supply tube communicating with the supply port via the solenoid valve, and a printing head attached to a lower end of the supply tube.

13. The service tank according to claim 12, wherein a proportion of an in-plane area of the ink opening to an in-plane area of a portion of the divider that is immersed in the ink in a case where the liquid surface of the ink stored is at the lower limit is lower than or equal to 50%.

14. The service tank according to claim 13, wherein:

a plurality of the dividers are provided;

at least one of the dividers is attached between the inlet and one of the supply ports provided in a position closest to the inlet; and another of the dividers is attached between ones of the supply ports that are adjacent to each other.

15. The service tank according to claim 12, wherein:

a plurality of the dividers are provided;

at least one of the dividers is attached between the inlet and one of the supply ports provided in a position closest to the inlet; and another of the dividers is attached between ones of the supply ports that are adjacent to each other.

* * * * *